United States Patent Office 3,625,061
Patented Dec. 7, 1971

3,625,061
BAROMETRIC ALTITUDE SIGNAL TRANSMITTER FOR PILOTS
Karlhans Schwarz, Owingen, Germany, assignor to Bodenseewerk Geratetechnik GmbH, Uberlingen (Bodensee), Germany
Filed Apr. 27, 1970, Ser. No. 32,067
Claims priority, application Germany, Apr. 30, 1969, P 19 22 077.0
Int. Cl. G01l 9/00
U.S. Cl. 73—384                    9 Claims

ABSTRACT OF THE DISCLOSURE

Ambient pressure communicates with a closed chamber through a valve and a throttle. Ambient pressure is applied to the cap of a first pressure sensitive transistor and with the base of a second pressure sensitive transistor while the base of the first and the cap of the second have reference pressures applied thereto from the chamber. The two transistors are connected in two legs of a bridge circuit. A constant current is applied to one diagonal of the bridge and an output signal is obtained from the other diagonal.

BACKGROUND AND SUMMARY OF THE INVENTION

Barometric altitude signal transmitters for aircraft are known wherein the pressure elements are supplied with an electric pickup or transducer. If such pressure elements are to operate throughout the full altitude range of the aircraft, they must necessarily have a relatively low degree of sensitivity. In contrast, where they are used for the purpose of maintaining a set altitude or controlling the rate of climb or descent, the pressure element moves only a short distance for aircraft movements within the desired range. These limited movements of the pressure elements must be translated by a complicated and space-consuming mechanical system into useful travels for the actuation of the transducer. Due to friction, a relatively high response threshold exists, meaning that only if the altitude deviation is relatively great, an error signal will actually be provided.

Barometirc altitude signal transmitters are known which respond to the difference between the static outside pressure and a reference pressure defined by the desired altitude. The reference pressure is provided by the pressure in a chamber which communicates with the ambient outside pressure through a throttle. A pressure element in the form of a pair of very thin bellows has, on the one hand, the static outside pressure applied thereto and, on the other hand, the pressure in the chamber. The deformation of the bellows is indicated on an instrument. A shutoff valve is in series with the throttle. When the valve is open, the throttle together with the air chamber acts like a pneumatic differentiating element. Due to the volume of air in the chamber, the change in the outside ambient air pressure, acting through the throttle, will change the air pressure in the chamber at only a slow rate (the rate of change being a factor of the pressure differential across the throttle). Thereby, the difference in pressure on the bellows and hence the indication of the instrument become proportional to the speed of climb or of descent. However, if the valve is closed, the pressure present in the chamber at a preestablished desired altitude may be stored, whereby the indication of the instrument is proportional to the deviation in altitude from the desired altitude. An important disadvantage is that prior devices of this type use a thin-walled barometric pressure element to seek to obtain the required sensitivity. This element can easily be destroyed if the actual altitude deviates by a substantial amount from the desired altitude due to a gust or wrong manipulation during this mode of operation.

Lately, pressure-sensitive transistors have become prior art. These are transistors which are energizable by a mechanical pressure, the electric output signal being dependent directionally on the difference in the pressures acting on the cap and the bottom of the transistor.

It is an object of the present invention to provide a barometric altitude signal transmitter for aircraft which avoids the disadvantages of prior altitude signal transmitters; a transmitter which is particularly sensitive to deviations in altitude without having a disturbing response threshold, which is simple and compact, and also which will not be damaged in the case of major deviations.

It is a further object of the present invention to provide a barometric altitude signal transmitter which directly provides an electric output signal. According to the present invention, the barometric signal transmitter for pilots is characterized in that it comprises at least one pressure-sensitive transistor as pressure-sensitive element.

A pressure-sensitive transistor of the type indicated is very small, responds quite rapidly and is practically free from friction and hysteresis. Besides, electromechanical transducers are eliminated, since an electric output signal of high quality is directly provided. Also, no damage can be caused to the transistor by large deviations. The pressure-sensitive transistor can be controlled by the outside ambient pressure on the one side and by a reference pressure on the other side thereof.

A very favorable signal will be obtained if two pressure-sensitive transistors are connected in opposition to each other for providing a resultant output signal, with one being controlled by the ambient pressure on the cap thereof and the reference pressure on the bottom thereof, and the other being controlled by the ambient pressure on the bottom and the reference pressure on the cap thereof.

The barometric altitude signal transmitter according to the invention can operate in the manner of the "variometer-statoscope" initially described herein in that the two pressure-sensitive transistors have applied thereto the static outside pressure as well as the pressure in an air chamber as a reference pressure, said chamber communicating with the outside ambient pressure through a throttle. A shutoff valve in the form of a magnet valve is provided in series with the throttle. The output signal thus obtained from the pressure-sensitive transistors corresponds to the speed of climb or of descent when the valve is open, while being proportional to the deviation from the altitude given at the moment the valve is closed.

DESCRIPTION OF A SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Figure 1:
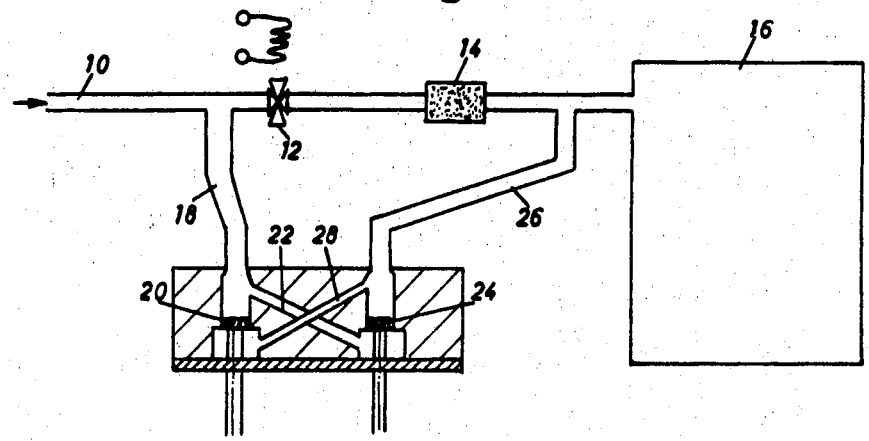
FIG. 1 illustrates schematically the mechanical construction of a barometric altitude signal transmitter incorporating the invention.

The altitude signal transmitter according to FIG. 1 picks up the outside ambient pressure at 10. This outside pressure is supplied through a magnetically operated valve 12 and a throttle 14 to an air chamber 16, otherwise sealed. The outside pressure is applied through a channel 18 onto the cap of a first pressure-sensitive transistor 20. Through channels 18 and 22 it also is applied to the bottom of a second pressure-sensitive transistor 24. The pressure in the air chamber 16 acts on the cap of the second pressure-sensitive transistor 24 through a channel 26 as well as on the bottom of the first pressure-sensitive transistor 20 through a channel 28.

Figure 2:
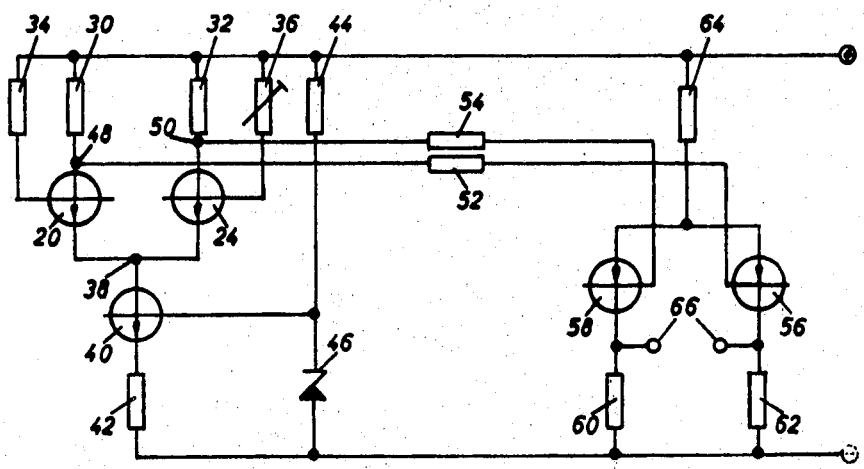
FIG. 2 is an electrical circuit diagram thereof.

As can be seen from FIG. 2, the two transistors 20 and 24 are connected in a bridge with two resistors 30 and 32, respectively. The transistors and the resistors each form a respective leg of the bridge. The bases of the transistors are energized through resistors 34, 36, the resistor 36 being adjustable for balancing the bridge. Connections are made from the power supply (not shown) to one diagonal of the bridge, i.e., the common end of resistors 30, 32, etc., and junction 38. The transistors 20 and 24 are connected symmetrically with respect to this bridge supply junction joint 38 through which a constant current is fed into the bridge. This constant current is controlled by a transistor 40 having a collector resistor 42, across the base of which a constant voltage is applied through a resistor and a Zener diode 46.

The output signal is derived from the other diagonal of the bridge, i.e., between the points 48 and 50. Through resistors 52 and 54 the output signal is applied to a sum-and-difference amplifier. This amplifier is in the form of a bridge and comprises transistors 56 and 58 which have collector resistors 60 and 62 and a common emitter resistor 64. An amplified output voltage is derived at connections 66 in the diagonal of the bridge. The voltage at connections 66 may be read by a suitable calibrated meter.

When a difference exists between the ambient outside pressure and the reference pressure in the chamber 16, the two transistors 20 and 24 will be actuated in an opposite sense so that the bridge becomes detuned to produce a corresponding reference signal across diagonal 48, 50 thereof. This reference signal appears as an output signal at the output terminals 66. With the magnet valve 12 open, the pressure in the chamber 16 follows the ambient outside pressure through the throttle 14, but with delay. Through the throttle 14 and the volume of chamber 16, a differentiation of the ambient outside pressure (and therewith of the barometrically measured altitude) is practically effected so that the output signal across the terminals 66 is indicative of the rate of climb or of descent.

A desired altitude reading as a reference may, however, also be stored by closing valve 12 when this altitude is reached and the ambient pressure at the altitude stabilized in chamber 16. Thus, the last existing pressure is stored in the chamber 16 as a reference pressure. Thereafter, the output signal across the terminals 66 corresponds to the difference between this stored reference pressure and the respective ambient outside pressure, and thereby corresponds to the deviation of the actual altitude from the desired altitude existing when the valve 12 was closed.

I claim:
1. In an apparatus for transmitting signals indicative of barometric altitude which apparatus includes an air pressure sensing device, the improvement wherein said device including a pressure sensitive transistor, said transistor having a first portion to which one fluid pressure is applied and a second portion to which a second fluid pressure is applied;
said apparatus including
first means for applying ambient air pressure to said first portion, and
second means for applying a reference fluid pressure to said second portion.

2. In an apparatus as set forth in claim 1, including
a second pressure sensitive transistor having first and second portions corresponding to the first and second portions of the first transistor;
said first means applying said ambient pressure to said second portion of said second transistor;
said second means applying said reference pressure to said first portion of said second transistor;
whereby said two transistors are actuated in opposition to each other; and
electrical circuit means connecting said transistors in opposition to each other.

3. In an apparatus as set forth in claim 2 and for use with a constant current source, wherein said electrical circuit means comprises a bridge having four legs and two pairs of junction points, each pair of junction points being on a respective diagonal of said bridge, the first transistor being in one leg and the second transistor being in a second leg, means for connecting one pair of junction points to said source, and output signal means connected to the other pair of junction points.

4. In an apparatus as set forth in claim 3, wherein said second means includes:
a closed chamber; and
a conduit device communicating with said chamber and with the ambient air pressure, said conduit including a throttle.

5. In an apparatus as set forth in claim 4, wherein said conduit device includes a shutoff valve in series with said throttle.

6. In an apparatus as set forth in claim 5, wherein said valve is magnetically operated.

7. In an apparatus as set forth in claim 1, wherein said second means includes:
a closed chamber; and
a conduit device communicating with said chamber and with the ambient air pressure, said conduit including a throttle.

8. In an apparatus as set forth in claim 7, wherein said conduit device includes a shutoff valve in series with said throttle.

9. In an apparatus as set forth in claim 8, wherein said valve is magnetically operated.

References Cited
UNITED STATES PATENTS 3,473,046  10/1969  Wonson _____ 73—398 X
3,293,584  12/1966  Legat et al. _____ 73—88.5 UX DONALD O. WOODIEL, Primary Examiner U.S. Cl. X.R.
73—179, 398 R